Patented Jan. 18, 1927.

1,614,645

UNITED STATES PATENT OFFICE.

DOMENICO BONOMINI, OF ALAMEDA, CALIFORNIA.

MUCILAGINOUS COMPOSITION AND METHOD OF MAKING THE SAME.

No Drawing.    Application filed April 26, 1924.  Serial No. 709,212.

My invention relates to an improved mucilaginous composition and method of making the same.

The object of my invention is to provide a glue, which is easily and quickly prepared of a few constituents, and which has a great adhesive quality.

My composition consists of a mixture of water, wheat flour, and commercial soda, i. e., sodium carbonate $Na_2CO_3$.

In preparing the composition I prefer to use the ingredients in about the following proportions:

5-gal. water, 6½-lbs. wheat flour and 5-oz. soda ($Na_2CO_3$).

These ingredients are agitated and thoroughly mixed in a suitable container after which they are allowed to set for ten minutes.

The mixture of water, wheat flour and sodium carbonate is maintained at a temperature of 212° F. for approximately fifty minutes, the mixture being simultaneously stirred or agitated, after which it is poured into suitable containers.

Having described my invention, I claim:

A mucilaginous composition containing wheat flour, sodium carbonate and water in the proportions of six and one-half pounds of flour to five ounces of sodium carbonate and five gallons of water, all the foregoing ingredients being intimately intermingled and allowed to set for ten minutes and then cooked and agitated for fifty minutes.

In testimony whereof I affix my signature.

DOMENICO BONOMINI.